United States Patent [19]

Cundy

[11] 4,219,609
[45] Aug. 26, 1980

[54] MINERAL PRODUCTS

[76] Inventor: Colin S. Cundy, Corporate Laboratory, The Heath, Runcorn, Cheshire, England

[21] Appl. No.: 889,924

[22] Filed: Mar. 24, 1978

[30] Foreign Application Priority Data

Apr. 6, 1977 [GB] United Kingdom ............... 14551/77

[51] Int. Cl.$^2$ ............................................. B32B 9/04
[52] U.S. Cl. .................................... 428/446; 264/82; 264/DIG. 80; 427/244; 427/255; 428/316
[58] Field of Search ................. 427/248 E, 244, 255; 264/82, DIG. 80; 428/316, 446, 454; 106/75, 291, DIG.2; 423/267, 268, 327, 328; 260/448.2 N

[56] References Cited

U.S. PATENT DOCUMENTS

| | | | |
|---|---|---|---|
| 2,306,222 | 12/1942 | Patnode | 428/273 |
| 2,356,542 | 8/1944 | Sloan | 428/446 X |
| 3,161,537 | 12/1964 | Dettre et al. | 427/255 |

FOREIGN PATENT DOCUMENTS

| | | | |
|---|---|---|---|
| 131927 | 9/1949 | Australia | 428/446 |
| 1076786 | 7/1967 | United Kingdom | 427/399 UX |

*Primary Examiner*—Evan K. Lawrence

[57] ABSTRACT

A process for the stabilization against water of a vermiculite article and the resultant product. The process consists essentially of contacting the article with the vapor of a nitrogen compound having the formula:

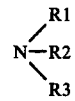

where R1, R2 and R3 which may be the same or different are either hydrogen atoms or alkyl groups containing up to seven carbon atoms, provided that where R2 and R3 are both hydrogen atoms, R1 is an alkyl group containing less than three or more than six carbon atoms.

6 Claims, No Drawings

MINERAL PRODUCTS

BACKGROUND OF THE INVENTION

This invention relates to layer-silicate products for example vermiculite products, and in particular to a method of imparting water resistance thereto.

It is known that the mineral vermiculite (and other layer-silicate minerals containing vermiculite layers, for example hydrobiotite or chlorite-vermiculite) may be fabricated into articles, for example, film, sheets or foam. Methods for the production of such materials are described in UK Pat. Nos. 1,016,385, 1,076,786 and 1,119,305, and copending UK application Nos. 51425/76 and 39510/76. Other layer-silicate minerals also form films or sheets, for example those described in U.S. Pat. No. 2,266,636. All the fabricated articles suffer from the disadvantage that they are affected by water, for instance unless they are protected e.g. by hydrophobic coatings, water will soak in and swell the mineral rendering it rather weak. Prolonged soaking in water may result in disintegration of the fabricated article.

However we have now found that a treatment may be given to the fabricated article which will stabilise it against disintegration in water.

SUMMARY OF THE INVENTION

The present invention is a process for the stabilization against water of a vermiculite article and the resultant product. The process consist essentially of contacting the article with the vapour of a compound having the formula:

where R1, R2 and R3 which may be the same or different are either hydrogen or alkyl groups. The groups R1, R2 and R3 are chosen such that the cation

does not itself cause swelling of the mineral in water. Of the various organo ammonium cations capable of causing vermiculite to swell appreciably, the most effective are mono alkyl ammonium cations having between 3 and 6 carbon atoms inclusive in the alkyl group, especially the mono alkyl ammonium cations n-butyl ammonium, isobutyl ammonium propyl ammonium and iso amyl ammonium. Therefore, for the present purpose we avoid the amino compounds $R_1NH_2$ where $R_1$ is an alkyl group containing between 3 and 6 carbon atoms inclusive. It is easier to produce the vapor of the compound

when the groups attached to the nitrogen are small groups therefore we prefer to use compounds in which R1, R2, R3 are alkyl groups containing up to seven carbon atoms (subject to the foregoing exclusions) more conveniently lower alkyl groups up to five carbon atoms. We especially prefer to use the most volatile compound of those included within the formula i.e. ammonia, in which R1, R2 and R3 are all hydrogen.

DESCRIPTION OF THE PREFERRED EMBODIMENTS

The vermiculite is preferably contacted with the vapor of the nitrogen compound by suspending the article or a sample of the article in an atmosphere containing the said vapour. The concentration of the vapour of the nitrogen compound in contact with the vermiculite may be varied over a wide range depending on the rate of the reaction desired.

The temperature used is preferably in the range from ambient to 200° C. Atmospheric pressure may conveniently be used but other pressures may be used if desired. The mineral articles made of vermiculite which are usefully treated by the process of the present invention include sheet, film, moulded articles and foam. It is especially advantageous for the treatment of rigid foams of vermiculite because the vapour is capable of penetrating below the surface of the foam and the water resistance imparted by the treatment is not confined merely to the surface layer only.

A method of imparting water resistance to sheets of vermiculite has been described in British Patent No. 1,016,385. In this method, vermiculite sheet is immersed in a strong solution of an electrolyte containing a polyvalent inorganic cation, such as magnesium chloride solution. The "swelling" cation originally present (e.g. n-butyl $N^+H_3$) is thereby displaced by a "non-swelling" cation (e.g. $Mg^{2+}$) to give a water-stable article. This method may be satisfactory for vermiculite sheet, but it suffers from at least two major disadvantages: (1) a thorough washing process is necessary after the cation exchange treatment to remove excess salts, and (2) the process involves a thorough wetting of the sheet and a subsequent re-drying. In the case of vermiculite foams, we have found that this process is very difficult to operate (due to the disadvantages mentioned above) because of the thickness and absorbent nature of the foam.

The method of imparting water resistance according to the present invention does not suffer from these two disadvantages and has been found to be ideally suited to the treatment of foam.

The invention is illustrated by the following examples.

EXAMPLE 1

A piece of a vermiculite sheet prepared from a suspension of n-butyl ammonium vermiculite lamellae as described in our copending applications UK Nos. 39510/76 and 51425/76 was immersed in distilled water and after 5 minutes the sample had disintegrated. A similar piece cut from the same sheet was placed in a closed glass vessel and supported above concentrated aqueous ammonia solution (density 0.91 g/ml). After 3 days, the sheet was removed and left in air to remove excess ammonia and water-vapor. The sheet was then immersed in distilled water. After 24 hours the sheet remained an integral piece and could readily be handled without disintegration.

EXAMPLE 2

Small blocks of rigid vermiculite foam produced both by the method of air entrainment as described in UK Patent Application No. 14764/76 and the method of microwave heating (UK Patent Application No. 47664/76) were placed in distilled water. After 15 minutes of occasional gentle agitation in the water they had both completely disintegrated. Similar blocks of foam were placed in a closed glass vessel and supported above concentrated aqueous ammonia solution (density 0.91 g/ml). After 24 hours, the foams were removed and left in air to remove excess ammonia and water vapour. The blocks were then placed in distilled water. After 72 hours in the water, with occasional gentle agitation, the blocks of foam (although they had absorbed some water) remained integral blocks and could readily be handled without disintegration.

EXAMPLE 3

A 10 Kg batch of South African vermiculite (Mandoval micron grade) was refluxed for 30 minutes in 30 l of saturated salt solution and after thorough washing in de-ionised water was returned to the 50 l reflux vessel where it was refluxed for a further 30 minutes in 30 l of 0.5 M n-butylammonium chloride solution. After thorough washing in de-ionised water and allowing to stand overnight the bulk volume of the ore had expanded to 45 l. The aqueous suspension of swollen vermiculite was adjusted to 20% w/w concentration then milled for 30 minutes in a Hobart vertical cutter mixter (Model VCM 40) at a speed of 3000 rpm and the larger vermiculite particles removed by passing the suspension through a vibrating sieve having an aperture size of 50 μm. The suspension obtained contained a lower solids concentration due to some larger particles of vermiculite being retained on the sieve and the suspension was concentrated by evaporation of water on a large heated tray until the concentration by weight of solids was again 20% w/w. The 20% w/w suspension was whipped into a foam using a Cruikshank mixer having a planetary beater. The foamed mixture was cast on a heated bed (70° C.) to dry giving a rigid foam of density 120 Kgm$^{-2}$. 25×25×10 mm samples were then cut from the foam slab and 6 specimens placed in each of a series of desiccators containing the following liquids for 16 hours.

(a) Concentrated aqueous ammonia solution (density 0.91 g/ml)
(b) Methylamine: 40% aqueous solution
(c) Dimethylamine: 50% aqueous solution
(d) Trimethylamine: 50% aqueous solution
(e) Ethylamine: 50% aqueous solution
(f) Propylamine: liquid
(g) Octylamine: liquid After treatment the samples were left in a well ventilated area to equilibrate: water stability and compression strength tests were then made as described below:

| | |
|---|---|
| (i) Water stability | One of each of the cut samples were placed in liquid water for periods up to 2 weeks |
| (ii) Compressive strength | Measured on Instron tensometer by standard technique after further equilibration in a relative humidity of 52% for 16 hours. |

Results

| (i) Water stability | |
|---|---|
| Blank | disintegration begins in less then 10 mins |
| Ammonia | stable for over 2 weeks |
| Methylamine | stable for over 2 weeks |
| Dimethylamine | stable for over 2 weeks |
| Trimethylamine | stable for over 2 weeks |
| Ethylamine | stable for over 2 weeks |
| Propylamine | disintegration begins in less than 10 mins |
| Octylamine | stable for over 2 weeks |

| (ii) Compressive strength | | MNm$^{-2}$ |
|---|---|---|
| Blank | (density 120 Kgm$^{-2}$) | .106 |
| Ammonia | | .161 |
| Methylamine | | .105 |
| Dimethylamine | | .116 |
| Trimethylamine | | .144 |
| Ethylamine | | .086 |
| Propylamine | | 0.106 |
| Octylamine | | .046 |

EXAMPLE 4

A similar experiment to the above was carried out using n-butylamine and decylamine, in this case the density of the untreated foam was 104 Kgm$^{-2}$.

| Sample | Water Stability | Compressive strength MNm$^{-2}$ |
|---|---|---|
| Blank | disintegration in less than 10 minutes | .075 |
| nBuNH$_2$ | | 0.121 |
| Decylamine | stable for more than 2 weeks | .070 |

As expected the samples of foam treated with n-propylamine and n-butylamine did not show any increase in water stability since those amines give cations on protonation which cause swelling of vermiculite in water. It may be observed that some of the amines and ammonia give rise to an increase in compressive strength of the treated foam in addition to the water stability.

The term "vermiculite" is used herein to cover materials described mineralogically or commercially as vermiculite, and includes other phyllosilicate minerals such as hydrobiotites or chlorite-vermiculites which contain a proportion of vermiculite-like layers and can be expanded in the same or similar manner.

What we claim is:

1. A process for the stabilization to water of a vermiculite article consisting essentially of contacting the article with the vapor of a nitrogen compound having the formula:

where R1, R2 and R3 which may be the same or different are either hydrogen atoms or alkyl groups containing up to seven carbon atoms, provided that where R2 and R3 are both hydrogen atoms, R1 is an alkyl group containing less than three or seven carbon atoms.

2. A process as claimed in claim 1 wherein the the said alkyl contain up to five carbon atoms.

3. A process as claimed in claim 1 conducted at a temperature from ambient to 200° C.

4. A process as claimed in claim 1 wherein the article treated with the nitrogen compound is a rigid form of vermiculite.

5. An article composed of vermiculite stabilized to water by a process as claimed in claim 1.

6. A process for the stabilisation to water of a vermiculite article consisting essentially of contacting the article with the vapor of ammonia.

* * * * *

UNITED STATES PATENT AND TRADEMARK OFFICE
CERTIFICATE OF CORRECTION

PATENT NO. : 4,219,609
DATED : August 26, 1980
INVENTOR(S) : Colin S. Cundy

It is certified that error appears in the above—identified patent and that said Letters Patent is hereby corrected as shown below:

On the title page, Insert:

-- (73) Assignee: Imperial Chemical Industries Limited, London, England--.

Signed and Sealed this

Twelfth Day of May 1981

[SEAL]

Attest:

RENE D. TEGTMEYER

Attesting Officer

Acting Commissioner of Patents and Trademarks